(12) United States Patent
Ishihara et al.

(10) Patent No.: US 6,814,774 B2
(45) Date of Patent: Nov. 9, 2004

(54) EXHAUST GAS PURIFICATION FILTER

(75) Inventors: Mikio Ishihara, Kariya (JP); Mamoru Nishimura, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/208,745

(22) Filed: Aug. 1, 2002

(65) Prior Publication Data

US 2003/0024220 A1 Feb. 6, 2003

(30) Foreign Application Priority Data

Aug. 6, 2001 (JP) .......................................... 2001-238087
May 14, 2002 (JP) .......................................... 2002-139009

(51) Int. Cl.[7] .......................... B01D 46/00; B01D 39/20
(52) U.S. Cl. .................. 55/523; 55/385.3; 55/DIG. 30; 60/311
(58) Field of Search ................................ 55/385.3, 523, 55/DIG. 3; 60/311; 502/439; 428/116

(56) References Cited

U.S. PATENT DOCUMENTS 4,632,683 A * 12/1986 Fukutani et al. ............... 55/523
5,634,952 A * 6/1997 Kasai et al. .................... 55/523
5,733,352 A * 3/1998 Ogawa et al. .................. 55/523
6,541,407 B2 * 4/2003 Merkel et al. .................. 55/523
2003/0007905 A1 * 1/2003 Tanaka et al. ................. 422/180

FOREIGN PATENT DOCUMENTS

JP 2726616 12/1997

* cited by examiner

*Primary Examiner*—Duane Smith
*Assistant Examiner*—Jason M. Greene
(74) *Attorney, Agent, or Firm*—Nixon & Vanderhye PC

(57) ABSTRACT

An exhaust purification filter having high filter efficiency and low pressure loss. The exhaust purification filter purifies exhaust gas by trapping particulate matter contained in exhaust gas discharged from an internal combustion engine. The exhaust gas purification filter has a honeycomb structure composed of partitions having a large number of pores, and cells separated by the partitions. The surface opening area of the partitions attributable to pores having a surface opening diameter of 10 μm or less is 20% or less of the total surface opening area ratio.

20 Claims, 3 Drawing Sheets

EXHAUST GAS PURIFICATION FILTER

BACKGROUND OF THE INVENTION

1. Field of the Invention

The present invention relates to an exhaust gas purification filter that purifies exhaust gas by trapping particulate matter contained in exhaust gas discharged from internal combustion engines.

2. Description of the Related Art

There is an exhaust gas purification filter according to the prior art that purifies exhaust gas by trapping particulate matter contained in exhaust gas discharged from internal combustion engines.

Said exhaust gas purification filter has a honeycomb structure consisting of partitions having a large number of pores and cells separated by said partitions.

During purification of exhaust gas using said exhaust gas purification filter, exhaust gas is led into the above cells, passes through the above partitions and moves to the adjacent cell. At this time, particulate matter contained in the above exhaust gas is purified by being trapped in the above partitions. In addition, by loading a catalyst, for example, onto the above partitions, the trapped particulate matter can be decomposed and removed by a catalytic reaction.

It is important for the performance of the above exhaust gas purification filter that the exhaust gas purification efficiency be high, and that pressure loss of the exhaust gas that passes through the filter be small.

Therefore, as is disclosed in Japanese Patent Publication No. 2726616, an exhaust gas purification filter is proposed that improves performance by specifying porosity, pore diameter and so forth within prescribed ranges.

However, with the demand for exhaust gas purification filters offering even higher performance in recent years, it is difficult to adequately improve exhaust gas purification efficiency and reduce exhaust gas pressure loss even with the above exhaust gas purification filter of the prior art.

Namely, as shown in FIG. 6, each pore 93 in partitions 91 of the above exhaust gas purification filter has a non-uniform surface opening diameter and pore diameter. Consequently, a phenomenon occurs in which particulate matter is deposited on surface 911 of the above partitions 91 and clogs openings 931 of pores 93 or particulate matter is not trapped by the above partitions 91 and ends up being discharged. As a result, it is difficult to achieve adequate improvement of purification efficiency or reduction of pressure loss.

SUMMARY OF THE INVENTION

In consideration of the above problems of the prior art, the object of the present invention is to provide an exhaust gas purification filter having high purification efficiency and low pressure loss.

A first aspect of the invention is an exhaust gas purification filter that purifies exhaust gas by trapping particulate matter contained in exhaust gas discharged from an internal combustion engine; wherein, said exhaust gas purification filter has a honeycomb structure composed of partitions having a large number of pores, and cells separated by said partitions, and the surface opening area ratio of said partitions attributable to pores having a surface opening diameter of 10 μm or less is 20% or less of the total surface opening area ratio.

The surface opening area ratio of the above partitions attributable to pores having a surface opening diameter of 10 μm or less is 20% or less of the total surface opening area ratio. Namely, there are few pores for which the surface opening diameter is excessively small that are comparatively susceptible to clogging of the openings by particulate matter. Consequently, the clogging of the openings of the pores by particulate matter and the deposition of particulate matter on the above partitions can be prevented.

As a result, exhaust gas can be adequately led into the above pores. For this reason, exhaust gas purification efficiency can be made to be adequately high. In addition, the pressure loss of exhaust gas led into the above exhaust gas purification filter can be held to a low level.

As has been described above, according to a first aspect of the invention, an exhaust gas purification filter can be provided that has high purification efficiency and low pressure loss.

A second aspect of the invention is an exhaust gas purification filter that purifies exhaust gas by trapping particulate matter contained in exhaust gas discharged from an internal combustion engine; wherein, said exhaust gas purification filter has a honeycomb structure composed of partitions having a large number of pores and cells separated by said partitions, the porosity of said partitions attributable to pores having a pore diameter of less than 10 μm is 10% or less, and the porosity attributable to pores having a pore diameter in excess of 70 μm is 10% or less.

The porosity of the above partitions attributable to pores having a pore diameter of 10 μm or less is 10% or less. Namely, there are few pores for which pore diameter is excessively small, which is a cause of increased pressure loss of exhaust gas led into the above exhaust gas purification filter. Consequently, the pressure loss of the exhaust gas can be held to a low level.

In addition, since there are few pores for which pore diameter is excessively small, which are comparatively susceptible to clogging by particulate matter, deposition of particulate matter on the partitions can be prevented. Consequently, exhaust gas can be adequately led into the pores and purification efficiency can be increased.

In addition, the porosity attributable to pores having a pore diameter in excess of 70 μm is 10% or less. Namely, there are few pores for which pore diameter is excessively large that make it comparatively difficult to trap particulate matter. Consequently, the above partitions are able to adequately trap particulate matter. For this reason, the above exhaust gas purification filter is able to adequately increase purification efficiency.

As has been described above, according to a second aspect of the invention, an exhaust gas purification filter can be provided having high purification efficiency and low pressure loss.

DETAILED DESCRIPTION OF THE PREFERRED EMBODIMENTS

Figure 1:
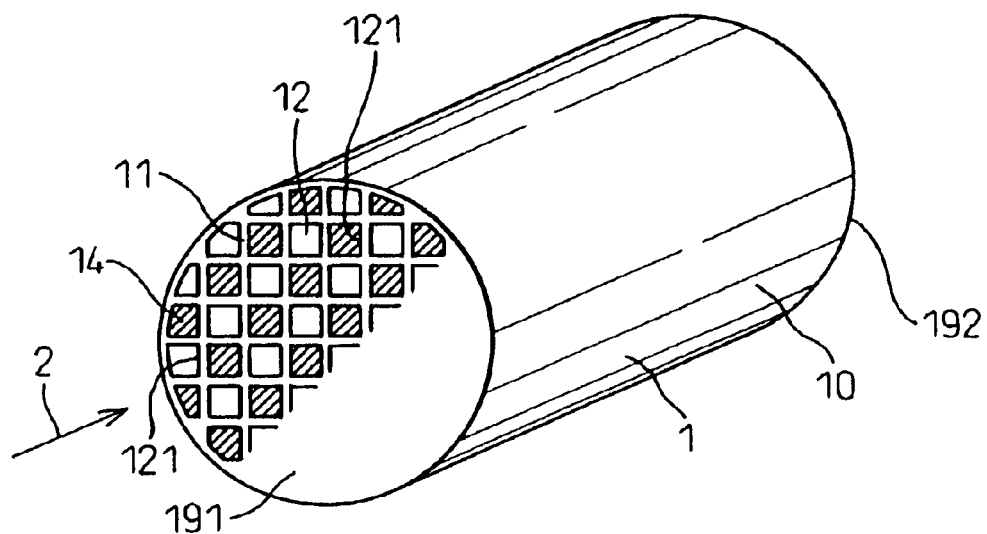
FIG. 1 is a perspective view of the exhaust gas purification filter of Embodiment 1.

In a first aspect of the invention, a diesel engine, for example, is used as the above internal combustion engine.

In addition, surface opening diameter refers to the diameter of pore openings in the surface of the partitions.

Surface opening diameter is measured using, for example, a laser depth microscope. Namely, images of the surface of the above partitions magnified by a factor of 200 are processed by the above laser depth microscope. As a result, portions having depth larger than a prescribed value can be detected as pore openings in the surface of the above partitions, and the surface opening diameter of those pore openings can be calculated.

In addition, a surface opening area ratio attributable to pores having a surface opening diameter of 10 $\mu$m or less refers to the ratio of the total area of all pores having a surface opening diameter as described above of 10 $\mu$m or less to the area of the partitions as measured by a laser depth microscope (and to apply similarly hereinafter).

In addition, a catalyst is preferably loaded onto the above partitions that contain the inner walls of the pores in the above exhaust gas purification filter. As a result, particulate matter that has been trapped in the above partitions can be decomposed and removed by the action of the above catalyst.

In addition, the surface opening area ratio of the above partitions attributable to pores having a surface opening diameter of 70 $\mu$m or less is preferably 40% or less of the total surface opening area ratio. In this case, purification efficiency can be further improved.

Next, in the above second aspect of the invention, the above pore diameter can be obtained by measuring with, for example, a mercury charging porosimeter.

In addition, the above porosity is the value obtained by measuring with, for example, a mercury charging porosimeter, and is the volume of the pores per unit volume of the partitions.

In addition, the porosity attributable to particles having a pore diameter in excess of 50 $\mu$m of the above partitions is preferably 10% or less.

In addition, the porosity of the above partitions attributable to pores having a pore diameter in excess of 70 $\mu$m is preferably 5% or less. In this case, the above partitions are able to even more adequately trap particulate matter. For this reason, the purification efficiency of the above exhaust gas purification filter can be made even higher.

In addition, the porosity attributable to pores having a pore diameter in excess of 50 $\mu$m is preferably 5% or less.

Next, the above honeycomb structure is preferably composed of cordierite, silicon carbide, aluminum titanate or zirconium phosphate. In this case, partitions having the desired surface opening diameter, pore diameter and porosity can be formed easily.

In addition, the overall porosity of the above partitions is preferably 55–75%. As a result, an exhaust gas purification filter can be provided having even higher purification efficiency and lower pressure loss.

In the case the above porosity is less than 55%, there is the risk of higher pressure loss. On the other hand, in the case the above porosity exceeds 75%, there is the risk of decreased strength of the exhaust gas purification filter.

In addition, the above honeycomb structure is provided with plugs in any of the openings of the above cells, and in the ends of the above honeycomb structure, openings that are provided with above plug and openings that are not provided with the above plug are alternately arranged, and the area of the above cell openings is preferably 0.6–2.25 mm$^2$.

In this case as well, an exhaust gas purification filter can be provided having higher purification efficiency and low pressure loss.

In the case of using the above exhaust gas purification filter, in one end of the above honeycomb structure, exhaust gas is led into the above cells from openings not provided with the above plug. Exhaust gas that has been led in passes through the above partitions, moves to an adjacent cell, and is then discharged from openings of said cell not provided with a plug. The above exhaust gas is then purified when it passes through the above partitions.

As has been described above, since openings of cells provided with the above plug and openings of cells not provided with the above plug are alternately arranged in the ends of the above honeycomb structure, cells into which exhaust gas is led and cells from which exhaust gas is discharged are arranged adjacent to each other. For this reason, exhaust gas efficiently passes through the above partitions. Thus, an exhaust gas purification filter can be obtained that has superior purification efficiency.

In addition, since the area of the above cell openings is 0.6–2.25 mm$^2$, an exhaust gas purification filter can be provided offering even higher purification efficiency and lower pressure loss.

In the case the area of the cell openings is less than 0.6 mm$^2$, there is the risk of pressure loss increasing. On the other hand, in the case the above area exceeds 2.25 mm$^2$, there is the risk of being unable to obtain adequate purification efficiency.

In addition, the average surface opening diameter of the above partitions is preferably greater than the average pore diameter.

In this case, an exhaust gas purification filter can be provided having even higher purification efficiency and lower pressure loss.

The above average surface opening diameter refers to the average of the surface opening diameters of all pores formed in the above partitions. In addition, the above average pore diameter refers to the average of the pore diameter of all pores formed in the above partitions.

Namely, the average surface opening diameter being larger than the average pore diameter means that there is at least a fixed proportion of pores present for which the surface opening diameter is larger than the pore diameter. Pores in which the surface opening diameter is larger than the pore diameter are comparatively resistant to deposition of particulate matter in their openings, and easily trap particulate matter inside. For this reason, clogging of the above pores can be prevented and purification efficiency can be improved. Consequently, as a result of such pores being present at an adequate proportion as mentioned above, purification efficiency can be adequately increased, and pressure loss can be adequately lowered.

As has been described above, surface opening diameter is measured using, for example, a laser depth microscope, while pore diameter is measured using, for example, a mercury charging porosimeter.

In addition, the average surface opening diameter of the above partitions is preferably at least 1.5 times the average pore diameter.

In this case, an exhaust gas purification filter can be provided having even higher purification efficiency and lower pressure loss.

In addition, the average surface opening diameter of the above partitions is preferably 1.5–2 times the average pore diameter.

This is because, by defining the average surface opening diameter to be no more than double the average pore diameter, decreases in purification efficiency can be prevented.

Embodiment 1

The following provides an explanation of an exhaust gas purification filter according to an embodiment of the present invention using FIGS. 1 through 4.

Exhaust gas purification filter 1 of the present embodiment purifies exhaust gas by trapping particulate matter contained in exhaust gas discharged from an internal combustion engine in the form of a diesel engine.

Figure 2:
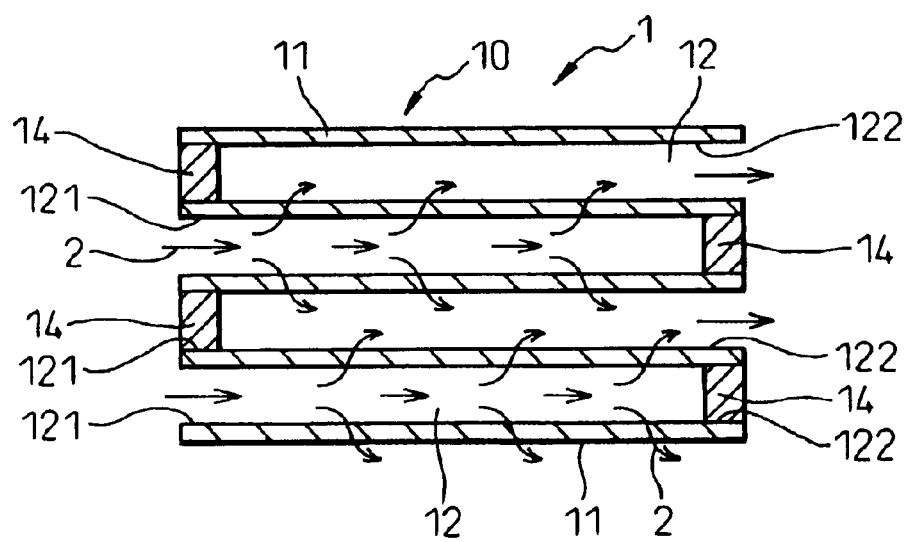
FIG. 2 is a cross-sectional explanatory drawing of the exhaust gas purification filter of Embodiment 1.
Figure 3:
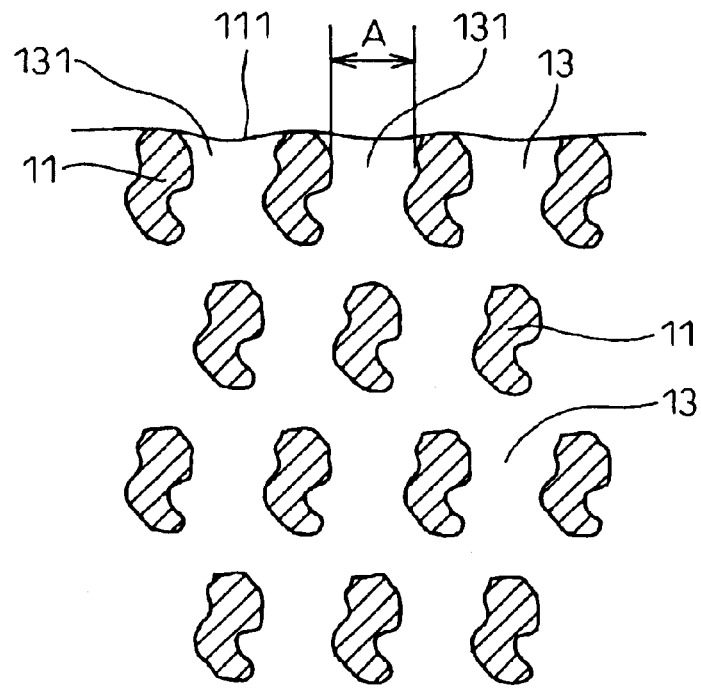
FIG. 3 is a cross-sectional view of the partitions of Embodiment 1.

As shown in FIGS. 1 through 3, said exhaust gas purification filter has a honeycomb structure 10 composed of partitions 11 having a large number of pores 13, and cells 12 separated by said partitions 11.

The surface opening area ratio of the above partitions 11 attributable to pores 13 in which surface opening diameter A shown in FIG. 3 is 10 μm or less is 20% or less of the total surface opening area ratio.

In addition, the surface opening area ratio of the above partitions 11 attributable to pores in which surface opening diameter A is 70 μm or more is 40% or less of the total surface opening area ratio.

The above "surface opening diameter" refers to the diameter of openings 131 of pores 13 in surface 111 of partitions 11. Surface opening diameter A is measured using a laser depth microscope. Namely, images of surface 111 of the above partitions 11 magnified by a factor of 200 are processed by the above laser depth microscope. As a result, surface opening diameter A is calculated by detecting the portions at which depth is larger than a prescribed value as openings 131 of pores 13 in surface 111 of the above partitions 11.

In addition, the above surface opening area ratio is the value obtained by measuring with a laser depth microscope, and is the surface opening area of pores 13 present per unit area of partitions 11.

In addition, "surface opening area ratio attributable to pores in which surface opening diameter is 10 μm or less" refers to the cumulative area occupied by pores in which the above surface opening diameter is 10 μm or less in the unit area of partitions 11 (and to apply similarly hereinafter).

In addition, the above exhaust gas purification filter 1 is composed by loading a catalyst onto the above partitions 11, including the inner walls of pores 13 (not shown). As a result, particulate matter trapped in the above partitions 11 can be decomposed and removed by the action of the above catalyst.

In addition, the above honeycomb structure 10 is composed of cordierite. Furthermore, silicon carbide, aluminum titanate or zirconium phosphate may be used instead of this cordierite.

In addition, the total porosity of the above partitions 11 is 55–75%.

As shown in FIGS. 1 and 2, the above exhaust gas purification filter is provided with plugs 14 in any of openings 121 and 122 of the above cells 12. Openings 121 and 122 of cells 12 provided with above plugs 14, and openings 121 and 122 of cells 12 not provided with the above plugs 14 are alternately arranged in ends 191 and 192 of the above honeycomb structure 10. Namely, as shown in FIG. 1, when the above honeycomb structure 10 is viewed from ends 191 and 192, the above plugs 14 are arranged in a so-called checkerwork pattern.

In addition, the area of openings 121 and 122 of the above cells 12 is 0.6–2.25 mm$^2$.

Figure 4:
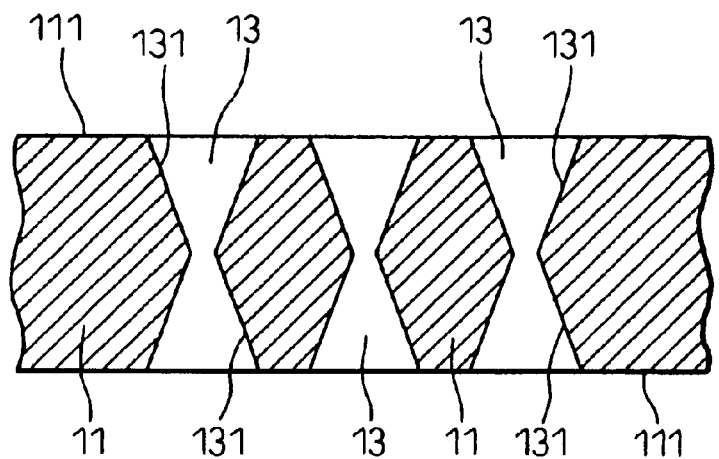
FIG. 4 is a schematic drawing of the pores formed in the partitions of Embodiment 1.

In addition, the average surface opening diameter of the above partitions 11 is greater than the average pore diameter. Namely, a large number of pores 13 are formed having a structure in which opening 131 is wide while the inside of the pores is narrow as shown in FIG. 4. More specifically, the average surface opening diameter is 1.5–2 times the average pore diameter.

The above average surface opening diameter refers to the average of the surface opening diameters of all pores 13 formed in the above partitions 11. In addition, the above average pore diameter refers to the average of the pore diameters of all pores 13 formed in the above partitions 11.

In the case of using the above exhaust gas purification filter 1, as shown in FIG. 2, exhaust gas 2 is led into the above cells 12 from openings 121 not provided with the above plugs 14 in one end 191 of the above honeycomb structure 10. Exhaust gas 2 that has entered passes through the above partitions 11, moves into adjacent cells 12, and is discharged from openings 122 not provided with plugs 14 of said cells 12. The above exhaust gas 2 is purified when it passes through the above partitions 11.

In the production of the above exhaust gas purification filter 1, a cordierite raw material is prepared composed the following SiO$_2$ raw material, MgO.SiO$_2$ raw material and Al$_2$O$_3$ raw material. Namely, the amount of particles of the SiO$_2$ raw material and MgO.SiO$_2$ raw material of 40 μm or less is 20 wt % or less of the total, while the amount of particles of 10 μm or less is 20 wt % or less of the total. In addition, the amount of particles of the Al$_2$O$_3$ raw material of 70 μm or less is 10 wt % or less of the total, while the amount of particles of 5 μm or less is 10 wt % or less of the total.

A honeycomb compact is obtained by adding water to the above cordierite raw material and mixing followed by extrusion molding. After molding, drying and baking are performed followed by applying a slurry to form plugs 14 in a so-called checkered pattern onto prescribed cell openings in the above honeycomb compact and baking. As a result, honeycomb structure 10 is obtained provided with plugs 14. An exhaust gas purification filter is then obtained by loading a catalyst such as platinum onto this ceramic honeycomb structure 10 (FIG. 1).

Next, an explanation is provided of the action and effects of the present embodiment.

The surface opening area ratio of the above partitions 11 attributable to pores 13 in which the surface opening diameter is 10 μm or less is 20% or less of the total surface opening area ratio. Namely, there are few pores having an excessively small surface opening diameter that are comparatively susceptible to clogging of openings 131 by particulate matter. Consequently, clogging of openings 131 of pores 13 by particulate matter, and its deposition on the above particles 11, can be prevented.

As a result, exhaust gas 2 can be adequately fed into the above pores 13. For this reason, the purification efficiency of exhaust gas 2 can be adequately increased. In addition, the pressure loss of the exhaust gas 2 fed into the above exhaust gas purification filter 1 can be reduced to a low level.

In addition, since the surface opening area ratio of the above partitions 11 attributable to pores in which the surface opening diameter is 70 μm is 40% or less of the total surface opening area, purification efficiency can be further improved.

Next, the above honeycomb structure 10 is composed of cordierite, silicon carbide, aluminum titanate or zirconium phosphate. Consequently, partitions can be formed easily that have the desired surface opening diameter, pore diameter and porosity.

In addition, since the total porosity of the above partitions 11 is 55–75%, an exhaust gas purification filter 1 can be provided that has even lower pressure loss.

In addition, openings 121 and 122 of cells 12 that are provided with the above plugs 14, and openings 121 and 122 of cells 12 that are not provided with the above plugs 14, are alternately arranged in ends 191 and 192 of the above honeycomb structure 10. Consequently, cells 12 into which exhaust gas 2 is led, and cells 12 from which it is discharged, are arranged adjacent to each other. For this reason, exhaust gas 2 efficiently passes through the above partitions 11. Thus, an exhaust gas purification filter can be obtained having superior purification efficiency.

In addition, since the area of openings 121 and 122 of the above cells 12 is 0.6–2.25 mm$^2$, an exhaust gas purification filter 1 can be provided having even higher purification efficiency and even lower pressure loss.

In addition, the average surface opening diameter of the above partitions 11 is larger than the average pore diameter (FIG. 4). For this reason, purification efficiency can be further increased and pressure loss can be decreased.

Namely, the average surface opening diameter being larger than the average pore diameter means that at least a fixed proportion of pores 13 are present in which the surface opening diameter is greater than the pore diameter. Pores 13 in which the surface opening diameter is larger than the pore diameter are comparatively resistant to deposition of particulate matter in their openings, and easily trap particulate matter inside. For this reason, clogging of the above pores 13 can be prevented and purification efficiency can be improved. Consequently, as a result of such pores 13 being present at an adequate proportion as mentioned above, purification efficiency can be adequately increased, and pressure loss can be adequately lowered.

As has been described above, according to the present invention, an exhaust gas purification filter can be provided having high purification efficiency and low pressure loss.

Embodiment 2

The present embodiment is an embodiment of an exhaust gas purification filter 1 in which the pore diameter of partitions 11 is defined.

Namely, the porosity of the above partitions 11 attributable to pores 13 in which the pore diameter is 10 μm or less is 10% or less. The porosity of the above partitions 11 attributable to pores 13 in which the pore diameter exceeds 70 μm is 10% or less.

Furthermore, the porosity attributable to pores in which the pore diameter exceeds 70 μm is preferably 5% or less.

The above pore diameter can be measured by a mercury charging porosimeter.

In addition, the above porosity is the value obtained by measuring with a mercury charging porosimeter, and is the volume of the pores per unit volume of partitions 11.

In addition, in the present embodiment, the average surface opening diameter of pores 13 of partitions 11 is not particularly defined.

Other aspects of the present embodiment are the same as Embodiment 1.

The porosity of the above partitions 11 attributable to pores 13 in which the pore diameter is 10 μm or less is 10% or less. Namely, there are few pores for which pore diameter is excessively small, which cause an increase in the pressure loss of exhaust gas 2 led into the above exhaust gas purification filter 1. Consequently, the pressure loss of exhaust gas 2 can be reduced to a low level.

In addition, since there are few pores for which pore diameter is excessively small, which are comparatively susceptible to clogging of pores 13 by particulate matter, deposition of particulate matter on partitions 11 can be prevented. Consequently, exhaust gas 2 can be efficiently led into pores 13, and purification efficiency can be increased.

In addition, the porosity attributable to pores 13 in which the pore diameter exceeds 70 μm is 10% or less. Namely, there are few pores in which pore diameter is excessively large, which have comparative difficulty in trapping particulate matter. Consequently, the above partitions 11 are able to adequately trap particulate matter. For this reason, the above exhaust gas purification filter is able to adequately increase purification efficiency.

As has been described above, according to the present invention, an exhaust gas purification filter can be provided that has high purification efficiency and low pressure loss.

Embodiment 3

Figure 5:
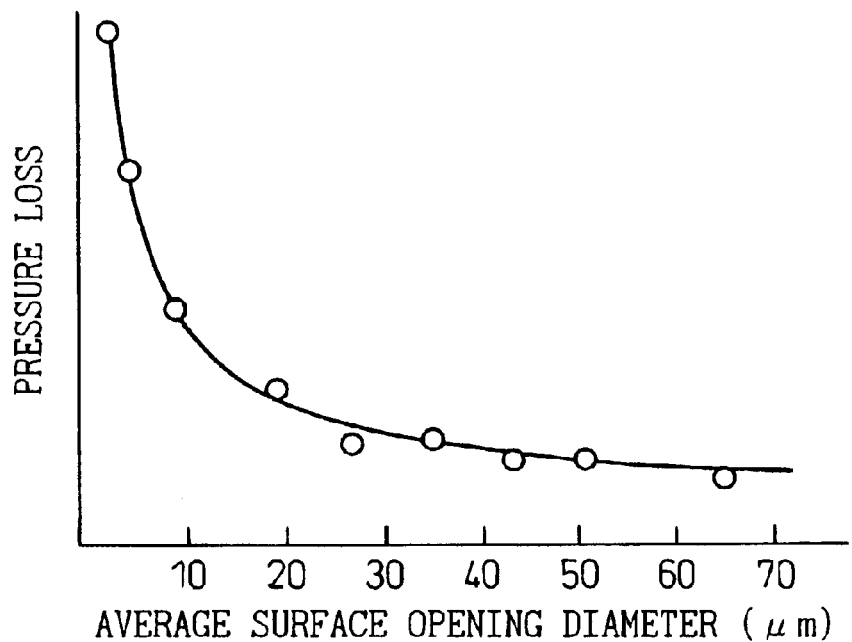
FIG. 5 is a graph representing the relationship between surface opening diameter in the partitions and pressure loss of the exhaust gas in Embodiment 3.
Figure 6:
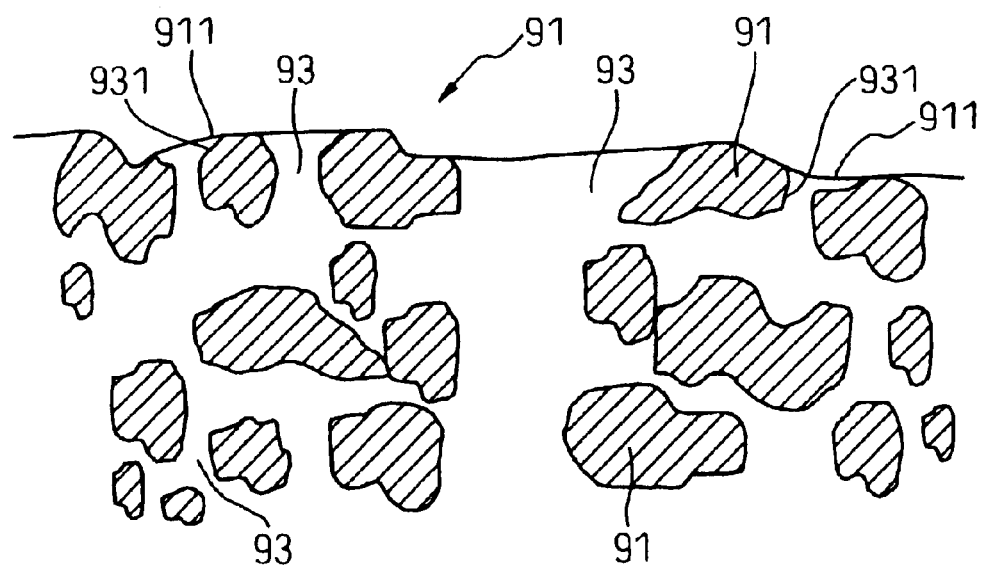
FIG. 6 is a cross-sectional view of the partitions of the prior art.

The present embodiment is an embodiment of measuring the relationship between average surface opening diameter and exhaust gas pressure loss in the partitions of an exhaust gas filter as shown in FIG. 5.

More specifically, pressure loss was measured for nine types of pores having an average surface opening diameter within the range of 3–65 μm by changing the particle sizes of $SiO_2$ raw material, $Mg.SiO_2$ raw material and $Al_2O_3$ raw material.

The measurement results are shown in FIG. 5.

As can be seen from FIG. 5, pressure loss becomes particularly high when the average surface opening diameter becomes 10 μm or less.

According to this embodiment, the presence of a large number of pores having a surface opening diameter of 10 μm or less was shown to be a major cause of decreased pressure loss. For this reason, it was determined that pressure loss can be decreased by reducing the number of pores having a surface opening diameter of 10 μm or less.

Embodiment 4

The present embodiment is an embodiment of measuring the relationship between the distribution of pore diameter in the partitions of an exhaust gas purification filter, the pressure loss of the exhaust gas, and the particulate matter trapping ratio as shown in Table 1.

Namely, as shown in Table 1, four types of exhaust gas purification filters were prepared having different ratios of porosity attributable to pores having a pore diameter of 10 μm or less to total porosity, and different ratios of porosity attributable to pores having a pore diameter larger than 70 μm to total porosity. These were designated as Samples 1 through 4, respectively, as shown in Table 1.

Measurement of the above pore diameter was performed by first measuring the porosity of pores of the relevant pore diameter by charging mercury into the pores using a mercury charging porosimeter for samples cut from the exhaust gas purification filters measuring 10×10×15 mm.

In addition, exhaust gas containing particulate matter was then allowed to flow through each exhaust gas purification filter at a flow rate of 2 m²/min. Pressure loss in front of and behind the exhaust gas purification filter was then measured with a manometer. Those results are shown in Table 1. In Table 1, the pressure loss ratio refers to the ratio of the pressure loss of the sample to the standard pressure loss of Sample 1 (100).

In addition, together with respectively measuring masses M1 and M2 of each exhaust gas purification filter before and after the flow of exhaust gas, mass N of the particulate matter that passed through the exhaust gas purification was also measured. The particulate matter trapping ratio P was then determined using the following equation based on the above values of M1, M2 and N.

$$P=(M2-M1)/(M2-M1+N)$$

The resulting values are shown in Table 1.

TABLE 1

| | Ratio of porosity of relevant pores to total porosity | | | |
| --- | --- | --- | --- | --- |
| | Pore diameter of less than 10 μm | Pore diameter of greater than 70 μm | Pressure loss ratio | Trapping ratio P |
| Sample 1 | 12.0% | 17.0% | 100 | 60% |
| Sample 2 | 21.4% | 7.5% | 160 | 80% |
| Sample 3 | 22.2% | 2.6% | 180 | 99% |
| Sample 4 | 6.0% | 4.0% | 80 | 96% |

As can be seen from Table 1, the greater the porosity attributable to pores having a pore diameter of less than 10 μm, the higher the pressure loss, and the smaller the porosity attributable to particles having a pore diameter of greater than 70 μm, the lower the pressure loss. On the other hand, the greater the porosity attributable to pores having a pore diameter greater than 70 μm, the lower the trapping ratio P, and the smaller the porosity attributable to pores having a pore diameter greater than 70 μm, the higher the trapping ratio P.

Sample 4, in which the ratio of porosity attributable to pores having a pore diameter of less than 10 μm is 10% or less, and the ratio of porosity attributable to pores having a pore diameter greater than 70 μm is 10% or less, exhibited a low pressure loss ratio (80), and a high trapping ratio (96%).

Based on these results, it was determined that pressure loss can be decreased and trapping ratio can be increased by making the ratio of porosity attributable to pores having a pore diameter of less than 10 μm 10% or less, and making the ratio of porosity attributable to pores having a pore diameter of greater than 70 μm 10% or less.

What is claimed is:

1. An exhaust gas purification filter that purifies exhaust gas by trapping particulate matter contained in exhaust gas discharged from an internal combustion engine; wherein,
    said exhaust gas purification filter has a honeycomb structure composed of partitions having a large number of pores, and cells separated by said partitions, and
    the surface opening area ratio of said partitions attributable to pores having a surface opening diameter of 10 μm or less is 20% or less of the total surface opening area ratio.

2. The exhaust gas purification filter according to claim 1 wherein, the surface opening area ratio of said partitions attributable to pores having surface opening diameter of 70 μm or more is 40% a or less of the total surface opening area ratio.

3. The exhaust gas purification filter according to claim 1 wherein, said honeycomb structure is composed of either cordierite, silicon carbide aluminum titanate or zirconium phosphate.

4. The exhaust gas purification filter according to claim 1 wherein, the total porosity of said partitions is 55–75%.

5. The exhaust gas purification filter according to claim 1 wherein, plugs are provided in any of the openings of said cells, openings of cells provided with said plugs and openings of cells not provided with said plugs are alternately arranged in the ends of said honeycomb structure, and the area of the openings of said cells is 0.6–2.25 mm².

6. The exhaust gas purification filter according to claim 1 wherein, the average surface opening diameter of said partitions is larger than the average pore diameter.

7. The exhaust gas purification filter according to claim 6 wherein, the average surface opening diameter of said partitions is 1.5 times or more the average pore diameter.

8. The exhaust gas purification filter according to claim 7 wherein, the average surface opening diameter of said partitions is 1.5 to 2 times the average pore diameter.

9. An exhaust gas purification filter that purifies exhaust gas by trapping particulate matter contained in exhaust gas discharged from an internal combustion engine; wherein,
    said exhaust gas purification filter has a honeycomb structure composed of partitions having a large number of pores and cells separated by said partitions,
    the porosity of said partitions attributable to pores having a pore diameter of less than 10 μm is 10% or less, and
    the porosity attributable to pores having a pore diameter in excess of 70 μm is 10% or less.

10. The exhaust gas purification filter according to claim 9 wherein, the porosity of said partitions attributable to pores having a pore diameter in excess of 70 μm is 5% or less.

11. The exhaust gas purification filter according to claim 9 wherein, said honeycomb structure is composed of either cordierite, silicon carbide aluminum titanate or zirconium phosphate.

12. The exhaust gas purification filter according to claim 9 wherein, the total porosity of said partitions is 55–75%.

13. The exhaust gas purification filter according to claim 9 wherein, plugs are provided in any of the openings of said cells, openings of cells provided with said plugs and openings of cells not provided with said plugs are alternately arranged in the ends of said honeycomb structure, and the area of the openings of aid cells is 0.6–2.25 mm².

14. The exhaust gas purification filter according to claim 9 wherein, the average surface opening diameter of said partitions is larger than the average pore diameter.

15. The exhaust gas purification filter according to claim 14 wherein, the average surface opening diameter of said partitions is 1.5 times or more the average pore diameter.

16. The exhaust gas purification filter according to claim 15 wherein, the average surface opening diameter of said partitions is 1.5 to 2 times the average pore diameter.

17. The exhaust gas purification filter according to claim 1 wherein, the surface opening area ratio of said partitions attributable to pores having surface opening diameter of 70 μm or more is 40% or less of the total surface opening area ratio.

18. The exhaust gas purification filter according to claim 3 wherein, in the production of the filter a cordierite raw material is prepared compose of SiO₂ raw material, MgO-.SiO₂ raw material and Al₂O₃ raw material.

19. The exhaust gas purification filter according to claim 1 wherein, the amount of particles of the SiO₂ raw material and MgO.SiO₂ raw material of 40 μm or less is 20 wt % or less of the total and the amount of particles of 10 $\mu$m or less is 20 wt % or less of the total and wherein the amount of particles of the $Al_2O_3$ raw material of 70 $\mu$m or less is 10 wt % or less of the total and the amount of particle of 5 $\mu$m or less is 10 wt % or less of the total.

20. The exhaust gas purification filter according to claim 9 wherein, the porosity of said partitions attributable to pores having a pore diameter in excess of 50 $\mu$m is 5% or less.

* * * * *